2,701,795

STREPTOMYCIN EXTRACTION

Arne N. Wick and Milton J. Vander Brook, Kalamazoo, Mich., assignors to The Upjohn Company, Kalamazoo, Mich., a corporation of Michigan No Drawing. Application December 12, 1945, Serial No. 634,622

15 Claims. (Cl. 260—210)

This invention relates to processes for the production of streptomycin and, more particularly, to a method for the recovery of streptomycin in such processes.

Streptomycin is obtained by inoculating a sterilized nutrient medium with a mold capable of producing the same and aerobically incubating the culture for a suitable period of time, usually about seventy hours. Thereafter, the brew is clarified and decolorized by acidification and the use of filter aids. The clear filtrate is then neutralized and a solid adsorbent, such as activated carbon, is employed to obtain the active portion of the filtrate as an adsorbate.

We have now found an improved procedure whereby the active streptomycin, adsorbed on the solid medium as above-described, can readily be recovered, either as its free base or as its acid salt. It is, accordingly, among the objects of this invention to provide a procedure for accomplishing such end.

We have discovered that streptomycin can be recovered from a porous adsorbent medium by eluting the same with an aqueous solution of a water-miscible ketone. The concentration of the ketone solution employed is dependent upon the acid used for acidification. For example, when the acid employed is sulfuric acid, the streptomycin is present as the sulfate, and the elution of the streptomycin can be accomplished with a ketone concentration below about 35 per cent. The preferred concentration of ketone solution used is below about 15 per cent. However, when the acid employed is hydrochloric acid, the streptomycin is present as the hydrochloride, and the elution of the streptomycin can be accomplished with a ketone concentration below about 60 per cent ketone. The eluate is then treated to increase the amount of ketone sufficiently to precipitate the streptomycin as the acid salt. It may be treated with an alkali substantially to neutralize the solution and cause the separation of some of the streptomycin without materially increasing the concentration of the ketone.

We have found that the concentrations of the ketone solutions above-described are critical. Thus, in certain ketone concentrations having a pH between about 3.0 and about 1.6, substantially all of the streptomycin salt is eluted from the porous adsorbent medium and remains in solution. When the concentration of the ketone is increased materially in this pH range, the streptomycin salt precipitates. It is thus by use of the above-described selective solvent and control of hydrogen ion concentration that we are able readily to recover streptomycin in good yields.

In ketone concentration up to about thirty-five per cent, where the streptomycin is present as the sulfate, substantially all of the streptomycin salt is eluted from the adsorbent and remains in solution. If the streptomycin salt is present as the hydrochloride, it is eluted and remains in solution at a ketone concentration up to about sixty per cent. These solubilities prevail in solutions having a pH between about 3.0 and about 1.6. To precipitate the streptomycin at the same pH, it is necessary to increase the ketone concentration to a figure about ten per cent greater than the solubility figures above-given. For example, if streptomycin sulfate is eluted from a porous adsorbent medium with an aqueous ketone containing about fifteen per cent of the ketone, at a pH between about 3.0 and about 1.6, it is necessary to increase the ketone concentration to about forty-five or fifty per cent to precipitate the streptomycin sulfate.

It is desirable to evaporate the eluate under reduced pressure, as in flash evaporation apparatus, to decrease the amount of ketone required to cause precipitation of the streptomycin salt, particularly when very dilute aqueous ketones are used in the elution step. It is also preferred to increase the concentration of the ketone to above about 80 percent in the precipitation step to insure recovery of all of the streptomycin salt. Concentrations as high as 87 per cent of acetone have been used in this latter step with excellent results.

The following examples illustrate the practice of our invention but are not to be construed as limiting the same.

Example 1

About 180 liters of liquid culture medium comprising the following ingredients: two pounds beef extract; two pounds peptone; two pounds sodium chloride; four pounds glucose; and sufficient tap water to make 180 liters, was inoculated with a mold culture, fermented for about 70 hours, clarified and decolorized by adding sufficient sulfuric acid to adjust the reaction to pH 2.0. One per cent by weight of activated carbon (Darco G–60) was added and the mixture was stirred for about 30 minutes. Two per cent by weight of diatomaceous earth (Celite) was added and the mycelium and carbon were filtered off and discarded. To the remaining filtrate sufficient saturated, aqueous sodium hydroxide was added to adjust the reaction to pH 7.0. To the streptomycin contained in the filtrate one per cent Darco G–60 was added and the mixture was stirred for about 20 minutes. The streptomycin present in the filtrate was adsorbed on the carbon and was filtered off. The filtrate, which contained no active substance, was discarded. To the carbon, which contained substantially all of the streptomycin, 8410 milliliters of water was added and sufficient hydrochloric acid to adjust the reaction to pH 2. Then, 18 liters of acetone was added and sufficient hydrochloric acid to adjust the reaction to pH 2. The carbon was removed by filtration and the filtrate was neutralized to pH 7.0 with aqueous sodium hydroxide. The neutralized filtrate was concentrated under reduced pressure to about one-twentieth of its volume. The carbon was discarded and the acetone eluate, which contained the active material, and the washings were united and sufficient 30 per cent aqueous sodium hydroxide was added to adjust the reaction to pH 7.7 and the eluate was chilled over night. A dark syrupy material in which the streptomycin was present settled on the bottom of the container. The supernatant portion was decanted and discarded. To this syrupy material sufficient water was added to dissolve it. It was then filtered, shell frozen and dried in vacuo. Ninety grams of streptomycin was recovered. The product obtained contained 100 to 150 units per milligram as tested by current assay.

Example 2

About 180 liters of the liquid culture medium prepared as in Example 1, was fermented for 70 hours, clarified and decolorized by adding sufficient sulfuric acid to adjust the reaction to pH 2. One per cent by weight of activated carbon (Darco G–60) was added and the mixture was stirred for about 30 minutes. Two per cent by weight of diatomaceous earth (Celite) was added and the mycelium and carbon were filtered off and discarded. To the remaining filtrate sufficient aqueous sodium hydroxide was added to adjust the reaction to pH 8.0. To the filtrate sulfuric acid was added to adjust the reaction to pH 7.0 and one per cent activated carbon was added and the mixture was stirred for about 30 minutes. Five tenths per cent Celite was added and the mixture was again stirred and filtered. The carbon cake was washed twice with 10 liters of water. The carbon was then eluted with 7.5 liters of five per cent aqueous acetone. While circulating the above acetone solution through the press sufficient sulfuric acid was added to adjust the pH to 2.0. The elution was repeated using six liters of five per cent aqueous acetone. Sufficient sulfuric acid was again added to adjust the pH to 2.0. The eluate was circulated for 30 minutes and was then withdrawn from the press. The carbon was discarded and the acetone eluate, and the washings, in which the active material was present were united and sufficient acetone was added to make a 75 per cent acetone solution. This was stirred and chilled overnight. A syrupy material in which the streptomycin was present settled on the bottom of the container. The syrupy material was suspended in 250 milliliters of pyrogen free water at about pH 3.0 and five grams of Celite was added. The insoluble material was filtered out and discarded. To the filtrate sufficient sodium hydroxide was added, filtered out and the streptomycin sulfate was recovered. Twenty-two grams of streptomycin sulfate was recovered. The product contained 375 units per milligram as tested by current assay.

*Example 3*

About 100 liters of liquid culture medium was prepared comprising the following ingredients: 1000 grams dextrose; 250 grams ammonium sulfate; 500 grams sodium chloride; 100 grams potassium hydrogen phosphate; 100 grams fermentation solubles (a waste product obtained from butanol fermentation); 400 grams calcium carbonate; and 100 liters of tap water. All of the ingredients except the calcium carbonate were dissolved in water and sterilized by autoclaving. The calcium carbonate was suspended in a small amount of the water, sterilized and added aseptically in small amounts during fermentation period to the main portion of the medium. The medium was seeded with a mold culture, fermented for about 70 hours, clarified and decolorized by adding sufficient sulfuric acid to adjust the reaction to pH 2.0. About 0.25 per cent of activated carbon (Nuchar) was added and the mixture was stirred. Two per cent by weight of diatomaceous earth (Celite) was added and the mycelium and carbon were filtered off and discarded. To the remaining filtrate sufficient saturated aqueous sodium hydroxide was added to adjust the reaction to pH 8.0. About 0.5 per cent Celite was added and the mixture was again filtered. To the filtrate sufficient concentrated sulfuric acid was added to adjust the reaction to pH 7.0. One per cent activated carbon (Darco G-60) was added and the mixture was stirred for about 30 minutes. About 0.5 per cent Celite was added and the mixture was again stirred and filtered. The filtrate, which contained no antibiotically active substance, was discarded. The carbon, which contained substantially all of the streptomycin was washed two times with water. The carbon was eluted with about 7.5 liters of five per cent aqueous acetone by circulating the acetone through the press. During the elution sufficient sulfuric acid was added to adjust the reaction to pH 2.5. The elution was continued by circulating the acetone through the press for about 30 minutes. The eluate was removed and the elution was repeated with six liters of five per cent aqueous acetone. Sufficient concentrated sulfuric acid was added to adjust the reaction to pH 2.5. The elution was again continued by circulating the acetone through the press for about 30 minutes. The eluate was removed and the elution was again repeated with six liters of five per cent aqueous acetone and sufficient concentrated sulfuric acid to adjust the reaction to pH 2.5. The elution was continued for 30 minutes. The combined eluates were united and 12 liters of acetone were added and the eluate was stirred and chilled over night. A white syrupy material in which the streptomycin was present settled on the bottom of the container. The supernatant liquid was filtered using Celite and the precipitate was combined with the syrupy material in the container. The syrupy material was dissolved in 250 milliliters of pyrogen-free water adjusted to pH 3.0 with sulfuric acid. Celite was added and the insoluble material was filtered and washed with about 12.5 milliliters of pyrogen-free water. The solution and washing were combined and sufficient 2.5 per cent sodium hydroxide was added to adjust the reaction to pH 7.0. Five grams of Celite was added and the solution was filtered and washed with pyrogen-free water. The streptomycin solution was then shell frozen and dried. Ten grams of streptomycin was recovered. The product obtained contained 500 units per milligram as tested by current assay.

While we have illustrated our invention by the use of acetone, ketones other than acetone can be used such as, for example, methylethylketone and isobutylketone. When the elution is conducted with certain of the water-miscible ketones, other than acetone, it is sometimes desirable to employ a quantity of acetone in effecting precipitation of the streptomycin from the eluate. This can readily be done and the mixed ketonic components remaining after the streptomycin has been recovered can be separated by fractional distillation.

While we are able to accomplish the precipitation of streptomycin from the eluate in a pH range between about 2.0 and about 8.0, we prefer to carry out the above-mentioned precipitation in a pH range between about 3.0 and about 2.0.

While we are able to produce a satisfactory, clinical grade, streptomycin by the use of the examples above-described, we are able to improve the appearance of the product, in color, for example, by resorting to addition of aluminum oxide to aqueous solutions of streptomycin and the subsequent filtration of the same.

We claim:

1. In a method for recovering streptomycin from adsorption on carbon, the steps which include: eluting the said streptomycin-carrying medium with an aqueous acid solution of a ketone; and, precipitating the streptomycin from the eluate by increasing the concentration of the said ketone therein.

2. In a method for recovering streptomycin sulfate from adsorption on a porous solid medium, the steps which include: eluting the said streptomycin sulfate-carrying medium with an aqueous solution of a ketone, said ketone being present in a concentration below about 35 per cent by volume; and, precipitating the streptomycin sulfate from the eluate by increasing the concentration of the said ketone therein to above about 50 per cent by volume.

3. In a method for recovering streptomycin hydrochloride from adsorption on a porous solid medium, the steps which include: eluting the said streptomycin hydrochloride-carrying medium with an aqueous solution of a ketone, said ketone being present in a concentration below about 60 per cent by volume; and, precipitating the streptomycin hydrochloride from the eluate by increasing the concentration of the said ketone therein to above about 70 per cent by volume.

4. The method according to claim 3 in which the pH of the ketone solution during precipitation is between about 3.0 and about 1.6.

5. The method according to claim 2 in which the pH of the ketone solution during precipitation is between about 3.0 and about 1.6.

6. The method according to claim 2 wherein the ketone concentration in the first step is about five per cent by volume.

7. In a method for recovering streptomycin sulfate from adsorption on a porous solid medium, the steps which include: eluting the said streptomycin sulfate-carrying medium with an aqueous solution of a ketone having a concentration below about 15 per cent by volume; and, precipitating the streptomycin sulfate from the eluate by increasing the ketone concentration above 50 per cent by volume while maintaining the pH of the same between about 3.0 and about 1.6.

8. In a method for recovering streptomycin acid salts from adsorption on carbon, the steps which include: eluting the streptomycin salt-carrying medium with an aqueous acid solution of ketone; evaporating the eluate under reduced pressure to decrease substantially the volume thereof; and, precipitating the streptomycin salt by increasing the concentration of the said ketone therein.

9. The method according to claim 8 wherein the ketone concentration in the precipitation step is increased to above about 80 per cent.

10. In a method for recovering streptomycin from adsorption on carbon, the steps which include: eluting the said streptomycin-carrying medium with an aqueous acid solution of acetone; and, precipitating the streptomycin from the eluate by increasing the concentration of the said acetone therein.

11. In a method for recovering streptomycin sulfate from adsorption on a porous solid medium, the steps which include: eluting the said streptomycin sulfate-carrying medium with an aqueous solution of acetone, said acetone being present in a concentration below about 35 per cent by volume; and, precipitating the streptomycin sulfate from the eluate by increasing the concentration of the said acetone therein to above about 50 per cent by volume.

12. In a method for recovering streptomycin hydrochloride from adsorption on a porous solid medium, the steps which include: eluting the said streptomycin hydrochloride-carrying medium with an aqueous solution of acetone, said acetone being present in a concentration below about 60 per cent by volume; and, precipitating the streptomycin hydrochloride from the eluate by increasing the concentration of the said acetone therein to above about 70 per cent by volume.

13. In a method for recovering streptomycin sulfate from adsorption on a porous solid medium, the steps which include: eluting the said streptomycin sulfate-carrying medium with an aqueous solution of acetone, said acetone being in a concentration below about 15 per cent by volume; and, precipitating the streptomycin sulfate from the eluate by increasing the acetone concentration above 50 per cent by volume while maintaining the pH of the same between about 3.0 and about 1.6.

14. In a method for recovering streptomycin acid salts from adsorption on carbon, the steps which include: eluting the streptomycin salt-carrying medium with an aqueous acid solution of acetone; evaporating the eluate under reduced pressure to decrease substantially the volume thereof; and, precipitating the streptomycin salt by increasing the concentration of the said ketone therein.

15. The method of producing an antibiotic substance comprising culturing *Actinomyces griseus* to produce streptomycin, acidifying the culture, intimately contacting the solid and liquid components of the culture, separating the solids from the culture liquid, and recovering an antibiotic substance from the culture liquid.

References Cited in the file of this patent

UNITED STATES PATENTS 2,446,102   Peck ------------------ July 27, 1948

OTHER REFERENCES

Waksman et al.: Proc. Soc. Exp. Biol. Med., vol. 49 (1942), pages 207–210.

Cheronis: "Semimicro- and Macro-Organic Chem." (New York, Crowell, 1942), pages 26–27.

Schatz et al.: Proc. Soc. Exp. Biol. Med., vol. 55 (January 1944), pages 66–69.

Waksman et al.: J. Am. Pharm. Assoc., v. 34 (1945), pages 276–277.

Carter et al.: J. Biol. Chem., vol. 160 (1945), pages 337–342.

Vander Brook et al.: J. Biol. Chem., v. 165 (1946), pages 463–468.